(12) United States Patent
Kulczycka

(10) Patent No.: US 6,717,584 B2
(45) Date of Patent: Apr. 6, 2004

(54) METHOD AND SYSTEM FOR VISUALIZING PAINT ON A COMPUTER-GENERATED OBJECT

(75) Inventor: Malgorzata A. Kulczycka, San Diego, CA (US)

(73) Assignee: General Motors Corporation, Detroit, MI (US)

( * ) Notice: Subject to any disclaimer, the term of this patent is extended or adjusted under 35 U.S.C. 154(b) by 191 days.

(21) Appl. No.: 09/992,763

(22) Filed: Nov. 6, 2001

(65) Prior Publication Data

US 2003/0085904 A1 May 8, 2003

(51) Int. Cl.$^7$ .................................................. C09G 5/02
(52) U.S. Cl. ...................... 345/589; 354/592; 354/629
(58) Field of Search ................................. 345/592, 581

(56) References Cited

U.S. PATENT DOCUMENTS 6,539,325 B1 * 3/2003 Numata et al. ............. 702/127
6,618,050 B1 * 9/2003 Rupieper et al. ........... 345/426

FOREIGN PATENT DOCUMENTS

JP           07-199820     * 8/1995     ............ G09F/9/00

OTHER PUBLICATIONS

Dumont–Bècle et al., "Paint Rendering On Virtual Vehicles," Oct. 13–18 1999. EquipAuto '99 Conference, Paris, France.*
Hanrahan et al., "Direct WYSIWYG Painting and Texturing on 3D Shapes," Aug. 6–10 1990. SIGGRAPH'90. ACM Press.*
Dumont–Bècle et al., "Multi–Texturing Approach for Paint Appearance Simulation on Virtual Vehicles." Sep. 2001. DSC2001. PP. 1–9.*

* cited by examiner

Primary Examiner—Matthew C. Bella
Assistant Examiner—Antonio Caschera
(74) Attorney, Agent, or Firm—Anthony Luke Simon

(57) ABSTRACT

The invention provides a method for visualizing paint on a computer-generated object. A color environment reflection map is adjusted based on a reflective quality rating of a paint, a transparency map is adjusted based on the reflective quality rating of the paint, and the maps are combined to render virtual paint on the computer-generated object.

21 Claims, 4 Drawing Sheets

METHOD AND SYSTEM FOR VISUALIZING PAINT ON A COMPUTER-GENERATED OBJECT

FIELD OF THE INVENTION

This present invention generally relates to a method and system of visualizing paint on a computer-generated object, and more specifically, to a method and system of visualizing automotive paint on a computer-generated vehicle design.

BACKGROUND OF THE INVENTION

Simulation of paint using computer-generated images allows rapid, cost-effective evaluation of the paint in anticipation of a final painted product. However, rendering of paint on objects such as automotive vehicles has yet to be realistic. A realistic rendering would capture reflections, highlights and color travel as the surfaces are illuminated by the sun, under ambient light, and in various environments. A realistic simulation would convey accurately what the actual painted product would look like. Conversely, a realistic simulation would allow a real paint to be identified by the paint color and characteristics from the image. Realistic simulation would aid designers in the selection of paint for a product offering and consumers in the choice of color on their new car or truck.

Traditional methods of evaluating paint on a mobile vehicle are time consuming, expensive and sometimes inefficient. One method is to obtain a real vehicle, paint it, and arrange for showing it. Sometimes there may be no vehicle available yet, for example, if the vehicle is in the process of being designed. Only math data or a surface description, for example, may be available. Alternatively, instead of a real vehicle an expensive clay model may be obtained. The clay model may be made and painted although the surfaces may be subject to change. Hard model evaluations require "freezing" a design, preventing the paint from being assessed rapidly when even minor changes in vehicle features occur. Evaluation of paint on full-size vehicles may be very costly and time consuming, and may present difficulties with storage and transport of models for wider audience viewing. Moreover, evaluation of an entire palette of paint colors and types becomes unwieldy.

A second method is to use individual paint chips or painted and contoured samples called "speed shapes", that may provide an impression of how an individual paint will look on a finished vehicle. However, smaller samples do not quite provide the full appreciation of what a final painted vehicle would look like, although color and feature analysis of an individual paint chip or sample may be utilized as a starting point for a realistic paint simulation.

A third method involves evaluation of replicated and retouched photographs of real vehicles painted with given paints. The retouched photographs may have different colors and may be used to provide a set of photographs for the same vehicle design re-painted with different colors. Retouching of the photograph may not result in accurate rendering of a paint that has compositions and characteristics such as flakes. If the original photograph represents a vehicle painted with a solid paint, it is quite difficult to retouch the original photograph to show the highlights and effects that are created by paints with flakes. Photographs of a vehicle show only a static view of the vehicle. Retouched photographs are dependent heavily on subjective judgment of the person who does the rendering and color image retouching, and are dependent on a color gamut of the printing media. Also, they do not provide enough correct visual queues to visualize the whole vehicle, especially from a variety of different viewing positions.

Accurate simulation and rendering with virtual paint has many benefits. It takes much less preparation time to visualize virtual paints than painting a real vehicle with a real paint. It gives a better opportunity to visualize vehicles with a new paint than if only paint samples or static photographs are used. It saves money by limiting a number of vehicles that need to be painted for the automotive paint evaluation. Models with paint for evaluation need not be stored, or shipped to viewing facilities. Preliminary automotive paint selection may be conducted using a computer-generated visualization for initial screening of potential paints. Consumer selection of a paint and finish may be conducted, for example, at a dealership prior to a vehicle purchase.

Accurate simulations of paint qualities lend themselves to increased usage of computer-generated objects in the paint selection and development process. A realistic paint model combined with accurate rendering allows a user to make adjustments to various factors defining the simulated paint, which may in turn be used to specify the color and characteristics of a real paint or set of paints.

Truly realistic paints need a more accurate description than simply the red/green/blue color components used in many graphics programs. The effect of paint composition should be captured. One should be able to distinguish between, for example, solid paints, paints with small flakes, paints with medium flakes, paints with coarse flakes, and pearlescent paints. One should be able to gather an accurate sense of the flake size and dimensions. Computer-generated paint representation should capture precisely the static and dynamic characteristics of the paint. Static aspects of the paint include paint color, structure, flop, reflectivity, texture, flakes, flake size and color, clarity of "hot spots", specular reflections, diffuse components, emission components, paint shininess, and clear coat finish. Dynamic properties include color travel, highlight travel, change of specular reflectivity and hot spot travel. All these characteristics should be mapped and represented properly in a virtual paint.

Every paint should reflect the surrounding environment differently, since each paint has its own reflectivity characteristics that are due to its unique composition. Reflectivity characteristics in a virtual paint should be distinguishable when viewing a series of simulated paints on a computer-generated model. Reflectivity characteristics of the paint vary with the environmental setting, and so the environment reflections should vary from paint to paint in a rendered, static object in changing environmental settings.

Realistic simulation of paint should be based on a description of a paint that includes paint characteristics, number of layers, layer composition, color, and components. If the paint has flakes, the computer-generated visualization of that paint should represent those flakes, their behavior, and their properties such as their size, color, material, density, distribution and reflectivity. In the case of metallic paint, the computer-generated visualization of that paint should realistically capture the effect of metallic properties.

Representation of computer-generated paint should be updated dynamically as if it were a real paint. If the painted surface changes in position with respect to surroundings or lighting conditions, or if the viewer changes position with respect to the surface, the computer-generated paint should be updated realistically and correctly. The quality and clearness of reflections of the environment reflected from the surfaces of a vehicle should be captured, and their dynamics should change while the vehicle changes its position with respect to the sun and the viewer, or when undergoing other types of lighting condition alterations.

Criterion such as computer-generated realistically looking paint means that for any paint, its unique properties such as texture, color, reflectivity, flakes, flop and gloss are captured and represented correctly in a computer-generated virtual environment. Virtual environments are generated using virtual reality technology. Virtual reality may be a tool for evaluating and selecting paints, requiring that virtual reality display devices as well as projection screens be adjusted or calibrated to accurately convey paint color and paint characteristics.

Technology to enhance realism of computer-generated visualization of exterior automotive paints are based, in part, on producing reflection texture maps that make a computer-generated vehicle look realistic and show more realistic reflections of the environment on the paint. These reflections are captured with computer graphics by using semi-transparent environment texture maps applied to a computer-generated object. An environment texture map may be described by a collection of quadruplets, where each quadruple is associated with a particular point or pixel of the map. The quadruplet contains three-color components: red, green, and blue; and a transparency component, called "alpha". Typical environment maps are evenly semi-transparent at each point or pixel of the map. However, different algorithms may be used to compute values of a transparency component for each pixel of the environment map. The algorithm may control the distribution of transparency throughout the map. The algorithm may vary the amount of reflections from paint to paint, to account for the reflectivity differences of each paint. The transparency distribution algorithm for environment maps should generate correct paint results in the computer-generated vehicle visualization, rather than just another abstract reflection effect.

Multiple reflection maps may be used to allow various viewing positions, where a user may change a location and view a vehicle from virtually any location in space, with smooth interpolations between various views. The algorithm should use more than one texture map and transparency map to create realistic environmental reflections from multiple orientations, with the paint along with its characteristics and reflections looking correct. The paint should be represented and visualized accurately in each position and should be generated rather quickly.

The objective of the current invention is the development of a method for visualizing automotive paints applied to computer-generated three-dimensional virtual vehicles. The results should be accurate and realistic, combining knowledge about computer graphics and knowledge about color, paint, and automotive surfaces.

Therefore, it would be desirable to provide a method and system for realistic visualization of paint on a computer-generated object, thus overcoming the aforementioned and other disadvantages.

SUMMARY OF THE INVENTION

One aspect of the invention provides a method for visualizing paint on a computer-generated object. Adjustments may be made to a color environment reflection map based on a reflective quality rating of the paint. Adjustments may also be made to a transparency map based on the reflective quality rating of the paint. The adjusted color reflection and transparency maps then may be combined, and be applied to the computer-generated object.

The color environment reflection map may comprise at least one photographic image of a reflective sphere in a selected environment. The photographic images of the reflective sphere may be taken from more than one viewing angle.

Additionally, the color environment reflection map may be adjusted based on a base color table that includes primary component information of a particular paint. This information may be based on spectrometer and chromometer measurements. The reflection map also may be adjusted based on at least one paint texture map. The paint texture map may be based on a paint description model corresponding to at least one member from a group consisting of flake size, flake density, flake distribution, flake composition, pearlescence, color travel, specular reflectivity, diffusivity, emissivity, highlights, gloss, and shininess.

The computer-generated object may be rendered and displayed. The display device may be a stereographic virtual reality device. The display device may be a screen or it may be an array of screens.

Another aspect of the invention is a computer usable medium that includes a program for rendering paint on a computer-generated object. The program comprises computer program code that combines an environment reflection map and a transparency map after they have been adjusted based on a reflective quality rating of a paint.

The program code may provide a base color table and adjust the color environment reflection map based on the table. The program code also may adjust the reflection map based on at least one paint texture map. The computer usable medium may comprise computer program code for rendering the computer-generated object and displaying the computer-generated object using a display device.

Another aspect of the invention provides a method for evaluating paint on a mobile vehicle. The evaluation method comprises rating a plurality of paints based on reflective quality; selecting one of the paints for simulation; providing a computer-generated image of the mobile vehicle; adjusting a color environment reflection map and a transparency map based on the reflective quality rating associated with the selected paint; rendering the image with the adjusted maps; and displaying the image. Additionally, the color environment reflection map may be adjusted based on a base color table. The color environment reflection map may be adjusted based on one or more texture maps.

Another aspect of the invention provides a system for evaluating paint on a mobile vehicle. This system provides means for rating a plurality of paints based on reflective quality; for selecting one of the paints for simulation; for providing a computer-generated image of the mobile vehicle; for adjusting a color environment reflection map and a transparency map based on the reflective quality rating associated with the selected paint; for rendering the image with the adjusted maps; and for displaying the rendered image. The system may further comprise means for adjusting the color environment reflection map based on a base color table, and means for adjusting the color environment reflection map based on at least one paint texture map.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
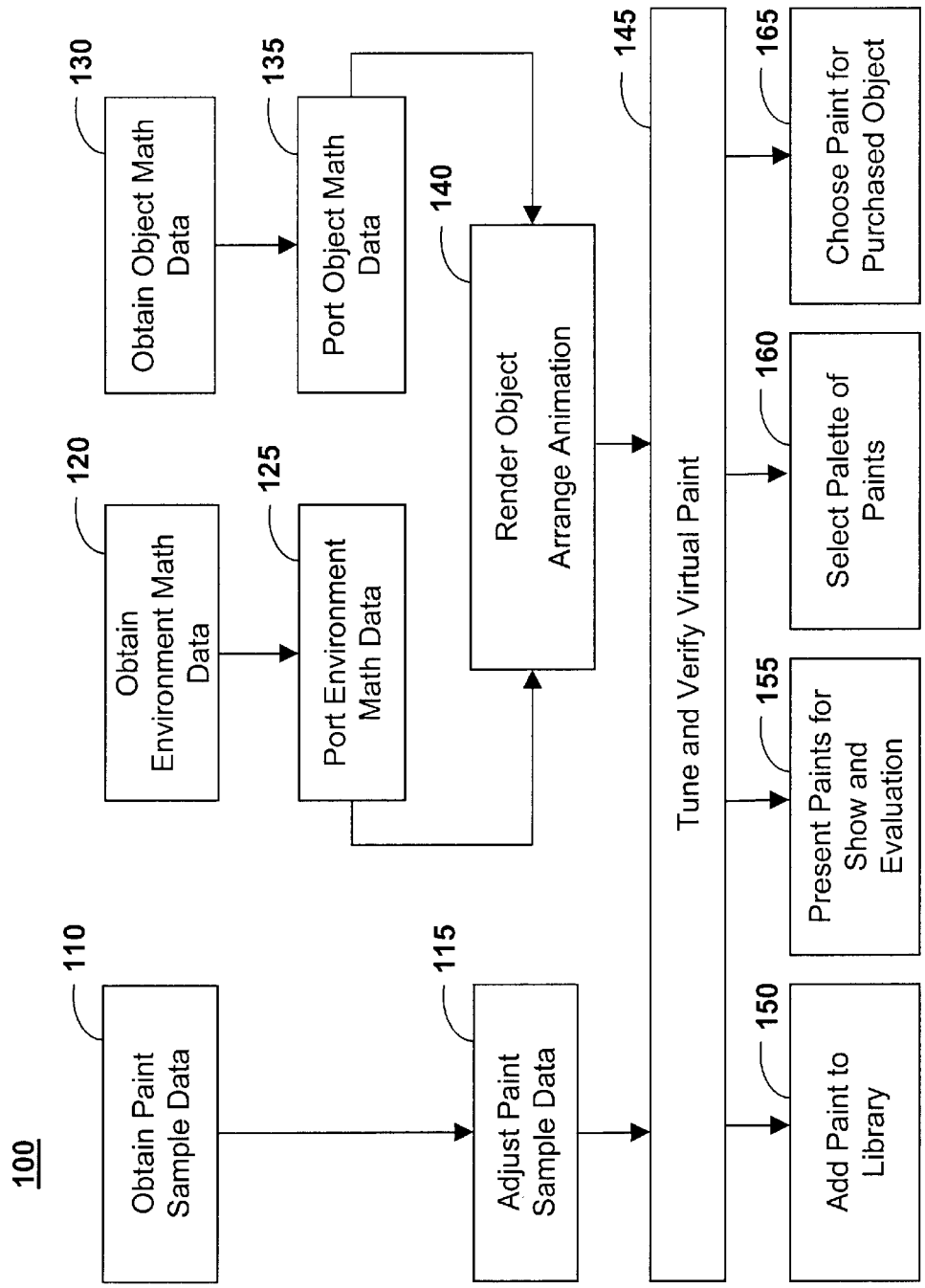
FIG. 1 is a flow diagram of one embodiment of a method for visualizing and evaluating paint on a computer-generated object, in accordance with the current invention.

FIG. 1 shows a flow diagram of one embodiment of a method for visualizing and evaluating virtual paint on a computer-generated object, in accordance with the present invention at 100.

Visualization and evaluation method 100 for displaying virtual paint on a computer-generated object may comprise a number of steps, some of which are understood in prior art of the computer graphics field. Other steps embody the present invention. The method may entail gathering data on a paint sample to assist in the development of a virtual paint. Math data representing the object and environment data representing an environmental setting may be ported into a real-time graphics program. The graphics program may render the object, and be used to generate sets of rendered objects for real-time animations. Reflections and paint behaviors may be captured using environment texture mapping techniques. The virtual paint may be rendered onto the computer-generated object and fine-tuned to create a realistically looking painted object. The virtual paint then may be added to a paint library, used for show and evaluation on an object, used for determining a palette of colors and paints to be offered with the object, or chosen by a customer, for example, when ordering a product with the selected paint.

Visualization and evaluation method 100 involves obtaining paint sample data, which may comprise information on the color values, static characteristics, and dynamic characteristics of the paint, as seen in 110. Empirical data may be gathered on the color of each layer of paint: the base coat, the finish coat, and any intermediate coats. A mathematical model or paint description model may be defined for the paint. Paints may be distinguished by their solid pigment layer, size of flakes, flake distribution, or pearlescent composition. The paint description model may include information about flake size, flake density, flake distribution, flake composition, pearlescence, beads, color travel, specular reflectivity, diffusivity, emissivity, highlights, gloss, and shininess. An intermediate coat of paint may include mica or aluminum flakes, beads, pigment, or tint. The finish or topcoat may be clear or tinted, with varying levels of gloss. Data may be gathered on the base color, color travel, highlights and reflectivity of the paint and specifically, the reflective effects of flakes and other components. Paint behavior may be captured, including color travel, specular reflections, diffuse components, emission components, and paint shininess. A paint sample may be viewed under real viewing conditions where the type, location and quality of the reflections on the paint are recorded and rated in order to differentiate between a variety of paints. Paint sample data may include, for example, a scoring system from A through F describing a reflective quality rating of the paint for different areas on a vehicle and with respect to lighting conditions. The paint sample data may be adjusted to best match the static, dynamic and reflective characteristics of the virtual paint with those of the real paint, as seen in 115. Paint data may be used to develop virtual paint that is rendered onto a computer-generated object.

Environment math data may be obtained, as seen in 120. The environment math data may comprise digital information taken from photographs of selected environments. The photographs may be taken of a reflective sphere in the chosen setting. A single photograph may be taken of a reflective sphere or hemisphere for static rendering. Multiple photographs may be taken of the sphere or hemisphere at different angles including different heights to render accurately a 3-D animation. Environment math data may include information on the reflectivity of a paint in a particular environment with attributes that define the reflectivity at any point on the object. A reflection-rating table may be created for each paint with ratings, for example, on how well the contours of the reflections are seen on a surface painted with a given paint, and on how well the color of the reflections may be seen on the painted surface. The information may be received from measurements of an actual painted surface. The information may be updated, adjusted or calculated within a computer program.

The environment math data may be ported to a software graphics program that can read, render and display math data, as seen in 125. The software graphics program may be a commercially available computer-aided design CAD program, a proprietary software program, or some combination of both.

Object math data may be obtained, as seen in 130. Object math data comprises information on points, lines, curves, surfaces and solids with coordinates and attributes that define the geometry of the object. The information may be received from measurements of an actual object. The information may be calculated within a computer program. The information may be generated using a CAD tool.

The object math data may be ported to a software graphics program to create a virtual object, as seen in 135. The software graphics program may be a commercially available CAD program, a proprietary software program, or some combination of both.

The graphics program may render the computer-generated object with the virtual paint and the environmental data. The graphics program may combine the rendering of the virtual object and the virtual environment into a real-time animation that displays a virtual object in a simulated environment, as seen in 140. The object may be rotated, translated and animated with smooth transitions.

The virtual paint, which is rendered onto the computer-generated object, may be fine tuned and verified by the user, as seen in 145. Adjustments of the virtual paint may be done to extract a more realistic representation of the paint and image, or to aid in the development of the paint. Fine-tuning of the virtual paint may be required for calibrating display equipment such as CRT projectors, monitors, and back-projected screens to the desired paint.

The paint may be adjusted to capture the reflections of the environment reflected on an object, such as the quality and clearness of the environment that is dependent on the object's surfaces, and to capture the dynamics of the paint while the object changes its position with respect to the light source and angle of view. The developer of the virtual paint may go through a verification process that compares the virtual paint to the real paint that it is simulating.

After the virtual paint has been finely tuned and verified, it may be added to a library of virtual paints from which paints may be accessed and reused to render on the same or different objects, as seen in 150. Designers of the object may develop a library of virtual paints that may be used to evaluate which paints are preferred for the given object. A number of paint colors may be presented and evaluated in a show of computer-generated objects, as seen in 155. Vehicle designers, for example, my wish to evaluate how paints will look on new vehicle designs by rendering virtual palm on computer-generated vehicles. These designers may develop three-dimensional immersive virtual shows of full-size newly designed vehicles that are rendered with paints being evaluated for inclusion in the final paint palette offered on a new vehicle model. The painted vehicle designs may be placed in a virtual outdoor environment to simulate how an actual vehicle will look in outdoor lighting and settings.

A virtual paint may be selected for inclusion in a palette of paints, as seen in 160. The palette may comprise the selection of virtual paints corresponding to the real paints that are available on a real object. For example, a car or truck may be painted in any one of the colors from the paint palette. Automotive designers, for example, may determine the palette of paint colors for a new vehicle design after viewing and evaluating how the developed paints look on a new vehicle design.

A real paint may be chosen for an object to be purchased, after a customer has seen a corresponding computer-generated objected rendered in the available paint colors, as seen in 165. Automotive companies, for example, may develop virtual shows of new or current automobile designs, which may be pictured in any of the available paint colors to help customers better visualize how an automobile will look with a certain paint. The customer then may choose paint for a new vehicle based on viewing realistically looking computer-generated vehicles rendered with the virtual paint.

Figure 2:
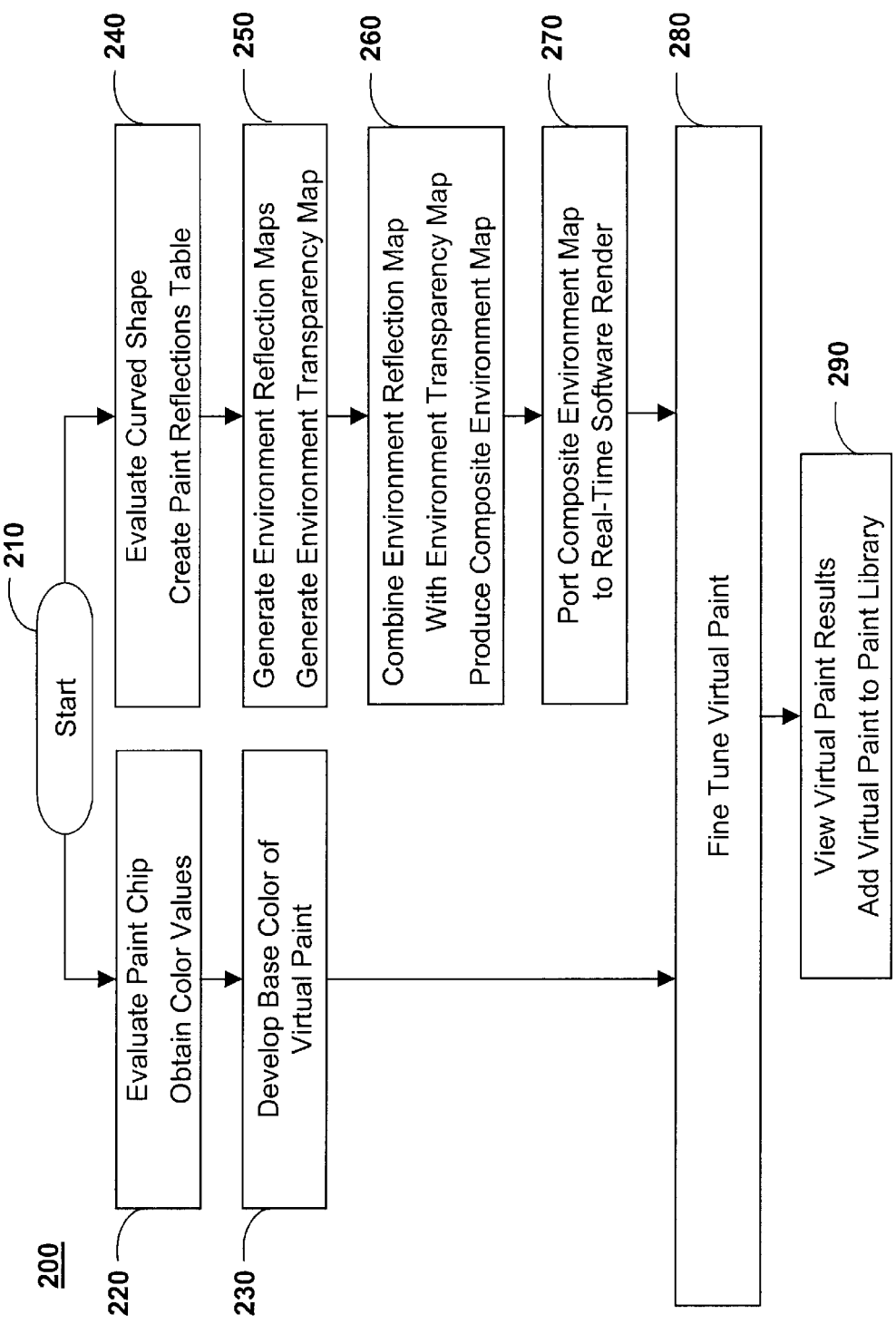
FIG. 2 is a flow diagram of one embodiment of a method for visualizing paint on a computer-generated object, in accordance with the current invention.

FIG. 2 shows a flow diagram of one embodiment of a method for visualizing paint on a computer-generated object, in accordance with the present invention at 200.

The process of visualizing paint may begin by choosing real paint samples to simulate, as seen in 210. The paint chip samples are evaluated by various means to obtain color values, as seen in 220. Empirical color data may be collected using a spectrometer under controlled lighting, or it may be collected by a chromometer under ambient lighting. Color values may be taken from a standard color value chart. Color values may include hue and saturation. Data may be organized in a base color table. The data taken from the base color of the paint sample may be ported into software graphics programs, a proprietary software program, or some combination of both. That data then may be used to develop a virtual paint, as seen in 230. The development of paint may include creating a paint description model with data on paint characteristics, number of paint layers, composition of layers, color, pigment, gloss, flakes and other paint components. The model, for example, may describe a three-layer paint with a clear-coat top layer, an intermediate paint layer with mica and pigment tint, and a base paint layer with solid pigment.

The reflections of a paint sample on a curved shape may be observed and those evaluations may be used in the creation of a paint reflections table, as seen in 240. A paint reflection table may be created by rating the reflectivity of the paint located on different parts of the object and by rating the reflectivity of environmental setting with regards to items such as sky, clouds, sun, the horizon, and the ground.

The evaluation of the curved shape may include recording the quality of reflections, which may be affected by the base color of the paint. For example, an object that is painted a glossy white color may reflect an image of the surrounding environment very little when compared with an object that is painted a glossy black color.

Photographic information may be used to generate at least one color environment reflection map and at least one environment transparency map in a graphics software program, as seen in 250. One or more photographs of a metallic or a painted curved shape in a chosen environment setting may be taken. The environment transparency map may comprise information on the opaque quality of the paint. The environment reflection map may be used to chart the reflective effects of the environmental setting on the particular paint. These maps may be combined to produce a composite environment map, as seen in 260. The composite environment map represents the specific reflective characteristics of the paint and reflective aspects of the environmental setting.

The composite environment map may be ported to a real-time software rendering program where the paint color may be added to the composite environment map, as seen in 270. The combined base paint color and composite map may be fine tuned to emphasize unique characteristics of the paint, as seen in 280.

For example, the reflective characteristics of the paint may be emphasized by producing a random spread of fine, medium, coarse or pearl-like flakes around the location of the reflected sun on the combined environment reflection and transparency map. The virtual paint also may be adjusted slightly, for example, to calibrate a specific projection system by using a color reference system between a real paint and virtual paint.

After the virtual paint has been fine tuned and calibrated for a display system, the virtual paint may be viewed by itself, rendered on a computer-generated object, or in a display of virtual paints, as seen in 290. The virtual paint also may be added to a virtual paint library that may be used again in graphic programs, as seen in 290.

Figure 3:
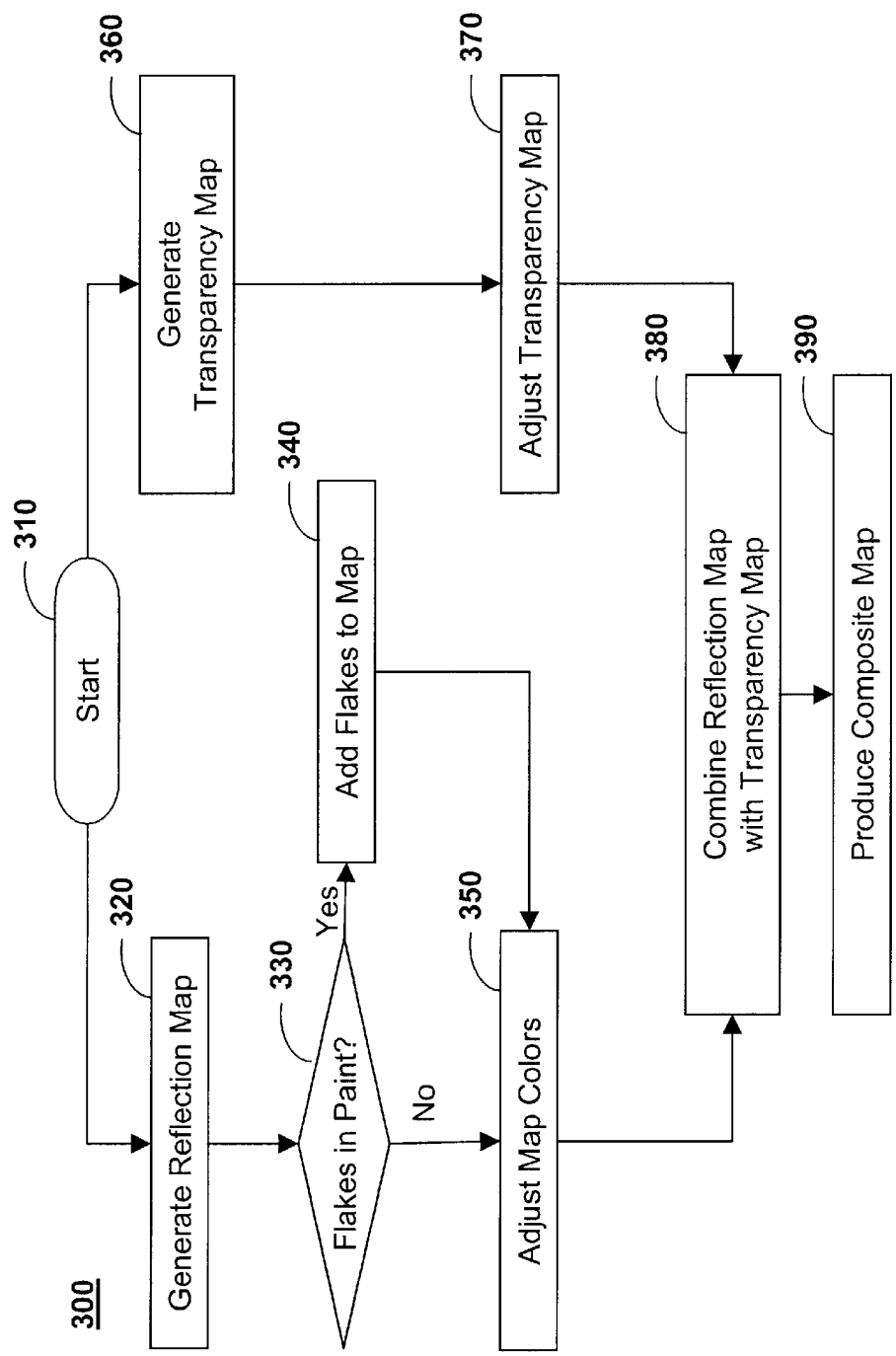
FIG. 3 is a flow diagram of another embodiment of a method for visualizing virtual paint on a computer-generated object, in accordance with the current invention.

FIG. 3 shows a flow diagram of another embodiment of a method for visualizing paint on a computer-generated object, in accordance with the present invention at 300. The method may comprise a number of processes for rendering realistic coloring, some that are known already in the computer graphics industry and others that are in the present invention. The method for developing and visualizing paint begins in 310.

The environment reflection map may be generated from an opaque photograph of a reflective sphere, as seen in 320 and previously seen in 260. The map may include, for example, reflections from the sky, clouds, horizon and pavement. A paint may be evaluated as to whether there are any flakes or other compositions in the paint, as seen in 330. If there are compositions in the paint such as fine, medium, course, or pearlescent flakes, the map may be adjusted to include the appropriate paint characteristics pertaining to the presence of flakes, as seen in 340. After altering the environment reflection map to account for flakes in the paint, if any, the colors of the environment reflection map may be adjusted according to a paint reflection map rating, as seen in 350.

The environment transparency map may be generated from a photograph of a reflective sphere, as seen in 360. The map may be equivalent to a black and white image of the environmental reflection map. Additional touching up of the map may be done to enhance, for example, the opacity of the environment transparency map near bright lights like the sun and clouds, near the horizon, or the underlying pavement. The environment transparency map may be, for example, a 50% gray map that represents semi-transparency. The environment transparency map may be adjusted to capture highlights or other characteristics of the paint. The opacity of the environment transparency map may be adjusted according to a paint reflection quality rating, as seen in 370. The transparency or alpha values of pixels may correspond with the environment transparency map. The spherical color reflection map and the environment transparency map may be combined by image processing tools, as seen in 380, producing the composite reflection and transparency map, as seen in 390.

Figure 4:
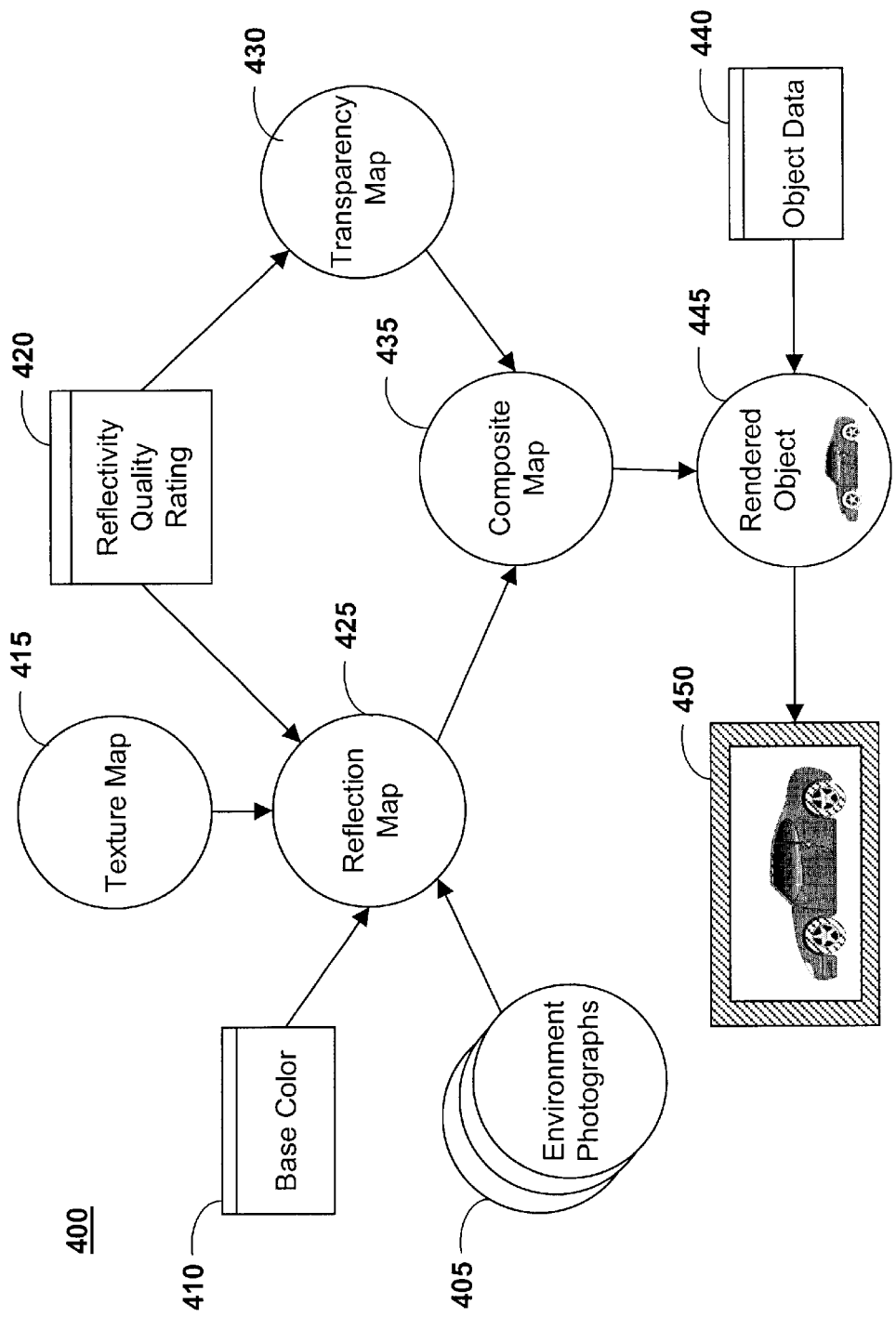
FIG. 4 is a system diagram for visualizing paints on a computer-generated object, in accordance with the current invention.

FIG. 4 is a system diagram for visualizing paints on a computer-generated object. The system for visualizing paints on a computer-generated object may involve a number of graphic maps, photographs, measurements and ratings, as represented in 400.

The system for creating virtual paint may use one or more environment photographs 405 that may be taken from one or more angles around a reflective sphere to capture the reflections of the selected environment. The environment may be, for example, an outdoor setting with sky, horizon, and pavement in bright sunlight. The environment may include the same setting in lighting diffused by clouds. Digital information taken from photographs of selected environments as seen in a reflective sphere may comprise an environmental reflection map.

The development of a virtual paint may utilize a base color table 410. Color component measurements of paints or a standard color table may provide the data for a base color table. Base color tables may be provided from a library of previously developed paints.

Composition information about the paint may be used to create paint texture map 415. An accurate representation of the texture of the paint including such paint components as mica or aluminum flakes and particles may be included. Paint component information such as flakes or pearlescence may add to the reflective nature of the paint and may be spread over the texture map, particularly around the areas where the reflections of the light source would be greatest in an environment photograph. More than one texture map may be used to create realistic reflections available from multiple viewing locations.

Reflective quality rating table 420 may be created for each paint, including ratings for reflections of the sky, clouds, sun, immediately above the horizon, at the level of the horizon, below the horizon, or the underlying ground or pavement. A paint may be rated on a scale that gages how well the reflections are seen on the contours of the surface painted with a given paint, illuminated, for example, with natural full summer sunshine. The paint also may be rated on how well the color of the reflections is seen on the surface painted with a given paint.

Transparency map 430 may be created by using mathematical algorithms and may be adjusted by using reflectivity quality rating 420. The calculated value of the transparency or alpha component may be based on the color of a paint or may be based on the distance from a given point on the map to the center of the map. The result may be a map with varied transparency throughout the map. More than one transparency map may be used to create realistic environmental reflections from multiple orientations.

Reflection map 425 comprises information from a number of sources, including one or more environment photographs 405, base color 410, texture map 415, and reflectivity quality rating table 420. Reflection map 425 may account for the environmental reflections and characteristics of the paint such as color, flakes, and pearlescence.

Composite map 435 combines transparency map 430 and reflection map 425. The static, dynamic and reflective characteristics of a paint may be represented in composite map 435.

Object data 440 comprises mathematical data with coordinates and attributes that define the geometry of the object. Combined maps 435 and object data 440 may be ported into a software program to create a rendered object 445. The final result may be the visualization and evaluation of paint on a computer-generated object, as seen in 450.

The paint represented in displayed in the computer-generated object 450 may be updated dynamically, as if it were real paint. When the painted surface changes its position with respect to the surroundings or under changing lighting conditions, the appearance of computer-generated object 450 may be updated to reflect those changes. A computer-generated object may be viewed from virtually any location in space and rendered with virtual paint that dynamically changes to reflect new simulated lighting conditions and surroundings. A virtual car, for example, may be rotated, translated and animated, with smooth transitions from one view to another. Animations may be done in real time, without the use of pre-rendered images. For example, there may be a virtual viewing scenario where a person walks around a vehicle to see what a vehicle's paint looks like in different lighting conditions and at different viewing angles. Computer-generated object 450 may be displayed in a realistic environment for viewing paints using, for example, three-dimensional stereographic virtual reality display devices or an array of screens or monitors displaying full size, computer-generated vehicles situated in a three dimensional, realistically looking, computer-generated outdoor environment.

Virtual paint system 400 may provide a fine-tuning and verification process for virtual paint development to allow, for example, fine tuning of the virtual paint based on an interactive adjustment of the color components, and an interactive comparison of the displayed virtual paint with a paint sample. The interface may provide easy adjustment of properties such as non-uniform distribution of transparency, addition of flakes, and on-line color adjustment. Adjustments may be made as desired to base color table 410, texture map 415, reflective quality rating table 420, reflection map 425, or transparency map 430. A color editor may be provided to make any desired adjustments, or to provide a convenient way of calibrating colors on a display.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of visualizing paint on a computer-generated object comprising:
   adjusting a color environment reflection map based on a reflective quality rating of a paint;
   adjusting a transparency map based on the reflective quality rating of the paint;
   combining the adjusted color environment reflection map and the adjusted environment transparency map; and rendering the computer-generated object based on the combined adjusted color environment reflection map and the adjusted environment transparency map.

2. The method of claim 1 wherein the color environment reflection map comprises at least one photographic image oh reflective sphere in a selected environment.

3. The method of claim 2 wherein the at least one photographic image comprises a plurality of photographic images of the reflective sphere taken from molt than one viewing angle.

4. The method of claim 1 further comprising:
providing a base color table comprising primary component information of a paint; and
adjusting the color environment reflection map based on the base color table.

5. The method of claim 4 wherein the base color table is based on spectrometer measurements.

6. The method of claim 4 wherein the base color table is based on chromometer measurements.

7. The method of claim 1 further comprising:
adjusting the color environment reflection map based on at least One paint texture map.

8. The method of claim 7 wherein the pain texture map is based on a pain; description model corresponding to at least one member selected from a group consisting of flake size, flake density, flake distribution, flake composition, pearlescence, bends, color ravel, specular reflectivity, diffusivity, emissivity, highlights, gloss, and shininess.

9. The method of claim 1 further comprising:
displaying the computer-generated object using a display device.

10. The method of claim 9 wherein the display device comprises a stereographic virtual reality device.

11. The method of claim 9 wherein the display device comprises at least one screen.

12. A computer usable medium including a program for rendering paint on a computer-generated object, comprising:
computer program code for adjusting a color environment reflection map based on a reflective quality rating of a pain;
computer program code for adjusting a transparency map based on the reflective quality raring of the paint; and
computer program code for combining the adjusted color environment reflection map and the adjusted environment transparency map; and computer program code for rendering the computer-generated object based on the combined adjusted color environment reflection map and the adjusted environment transparency map.

13. The computer usable medium of claim 12 further comprising:
providing a base color table comprising primary component information of a pain; and
computer program code for adjusting the color environment reflection map based on the base color table.

14. The computer usable medium of claim 12 further comprising:
computer program code for adjusting the color environment reflection map based on at least one paint texture map.

15. The computer usable medium of claim 12 further comprising:
computer program code for displaying the computer-generated object using a display device.

16. A method for evaluating paint on a mobile vehicle, comprising:
rating a plurality of pains based on reflective quality;
selecting one of the paints for simulation;
providing a computer-generated image of the mobile vehicle;
adjusting a color environment reflection map and a transparency map based on the reflective quality razing associated with the selected paint;
rendering the image with the adjusted maps; and
displaying the rendered image.

17. The method of claim 16 further comprising:
providing a base color table; and
adjusting the color environment reflection map based on the base color table.

18. The method of claim 16 further comprising:
adjusting the color environment reflection map based on at lean one paint texture map.

19. A system far evaluating palm on a mobile vehicle, comprising:
means for rating a plurality of paints based on reflective quality;
means for selecting ant of the paints for simulation;
means for providing a computer-generated image of the mobile vehicle;
means for adjusting a color environment reflection map and a transparency map bused on the reflective quality rating associated with to selected paint;
means for rendering the image with the adjusted maps; and
means for displaying the rendered image.

20. The system of claim 19 further comprising:
means for providing a base color table; and
means far adjusting the color environment reflection map based on the base color table.

21. The system of claim 19 further comprising:
means for adjusting the color environment reflection map based on at lean one paint texture map.

* * * * *